Dec. 15, 1936.  H. E. COLLINS  2,064,781

BELT

Filed Nov. 30, 1934

Inventor
Harold E. Collins

By

Attorney

Patented Dec. 15, 1936

2,064,781

UNITED STATES PATENT OFFICE 2,064,781

BELT

Harold E. Collins, Akron, Ohio, assignor to Wingfoot Corporation, Wilmington, Del., a corporation of Delaware Application November 30, 1934, Serial No. 755,421

9 Claims. (Cl. 74—232)

The present invention relates to belts and, more particularly, to flat driving and conveyor belts having reinforcing load-carrying members embedded in a rubber body and covered with improved fabric which protects the belt and yet permits the ready flexing of the belt around pulleys or the like of relatively small diameters.

Prior to the present invention belts having load-carrying members in the form of relatively strong cords positioned in a middle or so-called neutral plane of the belt, with a cover of biaslaid or straight-laid cross-woven fabric, have been manufactured and sold. However, considerable difficulty and belt failure has been caused by the fact that when the belts are bent around pulleys of small radii, the material of the belt below the load-carrying cords is put under severe compression forces while the material of the belt to the outside of the load-carrying cords is subjected to high tensile stresses. These compression and tensile forces have resulted in belt failure due to rupture or cracking of the belt cover with the resulting attack of dirt, grit and the like to the interior of the belt so that failure soon results.

Some consideration has been given in the past to providing elastic fabric by making a certain type of weave and cord twist, for example see Patents Nos. 1,823,053, 1,823,034, 1,575,003 and 1,473,427. However these patents are concerned solely with elastic fabric for use on the top of stockings, trousers or the like to effect the desired attaching of the clothing in position. There is no suggestion in these patents that an improved belt structure could be provided by incorporating certain modified and improved fabric features with a belt structure.

In addition there are several patents, such as Numbers 378,151 and 1,347,254, which disclose fabric for belts composed of a particular weave and cord twist which is alleged to improve the belt operation. However, these patents are concerned with an all-fabric belt in which the inherent operation and structure is entirely distinct from that of the improved belt structure herein disclosed.

It is an object of the present invention to avoid and overcome the difficulties of prior-known belt failures by the provision of an improved fabric for covering a rubber belt having reinforcing cords carried at a substantially middle plane of the belt.

Another object of the invention is to provide a resilient covering fabric for belt structures, with the cords in the covering fabric running transversely and longitudinally of the belt, with the longitudinal cords being particularly designed to absorb and permit the alternate tension and compression forces to which the belt cover is subjected when the belt is used.

Another object of the invention is to provide an improved flat conveyor belt.

Another object of the invention is to provide an improved flat driving belt.

Another object of the invention is to provide an improved protective covering-fabric for belt use.

The foregoing and other objects of the invention are achieved by the structure hereafter described and illustrated in the accompanying drawing:

Wherein Fig. 1 is a diagrammatic side elevation of a belt drive incorporating the improved belt structure of the present invention;

Figure 1:
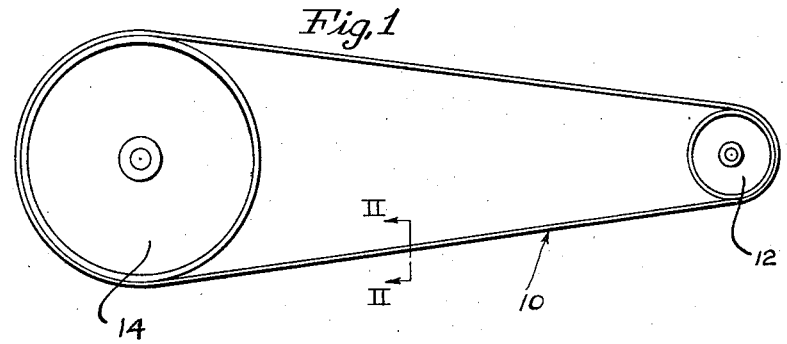

Referring to the drawing, the numeral 10 indicates generally the improved belt of the present invention and, as illustrated in Fig. 1, the belt is used to transmit power from a relatively small driving pulley 12 to a larger driven pulley 14. It will be understood that in the operation of a drive of this character, the belt 10 must be continually flexed around the relatively small radius of the driving pulley 12 and that the belt is accordingly subjected to high tension and compression forces which are rapidly and periodically repeated.

Figure 2:
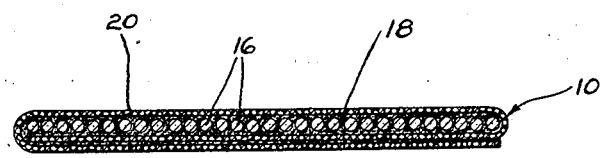
Fig. 2 is a cross-sectional view of the improved belt taken on line 2—2 of Fig. 1.
Figure 3:
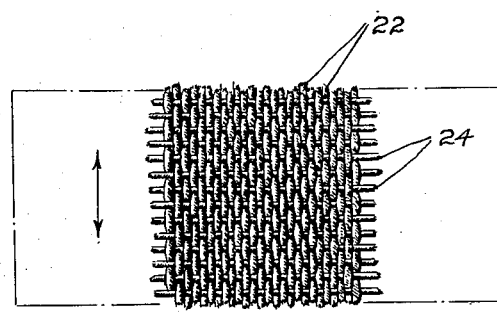
Fig. 3 is a plan view of a fragment of the belt structure illustrating the arrangement of the cords in the covering fabric.
Figure 4:
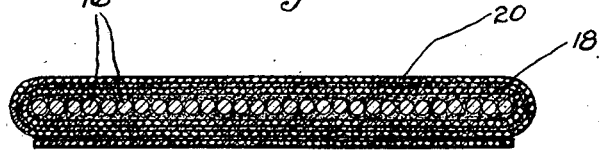
Fig. 4 is a cross-sectional view similar to Fig. 2 of a modified belt structure.

As seen in Fig. 2, the belt 10 includes one or more layers of strong reinforcing cords 16 which may be formed in a helical coil which is embedded in the rubber body 18 of the belt. In larger belts the cords 16 may form two or more layers, and in some constructions additional fabric or rubber can be included in the body of the belt proper, as will be understood by those skilled in the art. Surrounding the belt body is a cover or jacket 20 of fabric constructed and laid in accordance with the principles of the present invention. As best seen in Fig. 3 the cover 20 includes longitudinal or warp cords 22 and lateral or weft cords 24. The weft cords 24 are preferably of ordinary cotton fibers with the usual or standard twist and these weft cords are laid in the fabric at spaced intervals under considerable tension so that the cords themselves are substantially straight with the warp cords 22 being run over and under the straight weft cords in undulations. The warp cords 22 are positioned approximately side by side, being alternately over and under and these cords are of a very special twist which is so calculated as to give relatively high resiliency and elongation at the expense of tensile strength. In other words, the cords are twisted more tightly (a greater number of turns per inch) than is necessary to give maximum tensile strength. Cords for use in belts have heretofore always been twisted to provide the greatest tensile strength and the particular twist is dependent on the length of the cotton fibers. By the present invention the cords are twisted between approximately 14% and 24% more than the turns necessary to give the maximum tensile strength. This imparts an increased resiliency to the cords without unduly lowering the tensile strength so that the ability of the cords to take tension and compression stresses without fatigue is greatly increased over cords heretofore known or used.

Briefly, the warp cords 22 with their special twist are adapted to resiliently yield to tension stresses and to spring back in place upon removal of the stresses without being adversely affected by the constant application and removal of these forces. In the same manner the cords are capable of absorbing compression forces periodically and rapidly for long periods of time without heating and deterioration. These factors are very important in that the belt structure when flexing around a pulley of small diameter sets up relatively high periodic tension in all portions of the belt cover lying radially outwardly of the load-carrying cords 16 of the belt. At the same time the belt cover 20 positioned radially inwardly of the load-carrying cords 16 is subjected to severe periodic compression forces. However the special twist of the warp cords 22, which are preferably of cotton or the same material as the weft cords 24, permits the use of the belt about small pulleys at high speeds for long periods of use.

Another feature of the invention resides in weaving the fabric of the belt cover with the weft cords 24 very tight and straight and with the warp cords 22 in undulating, over-and-under position in a somewhat loose weave. Thus, when the warp cords 22 are subjected to high tensional forces and the cords stretch because of their inherent twist, they will likewise tend to straighten out and effect a kinking action on the weft cords 24, which will no longer be straight but actually up and down and over and under themselves. It will thus be evident that a double cushioning effect is provided by the improved belt covering fabric and that the same is particularly adapted for finishing high-speed belts which rotate about relatively small arcs.

While the invention has been particularly illustrated and described in conjunction with flat belts it will be appreciated that the principles thereof are applicable to the manufacture of belts of substantially any kind, such as V belts, conveyor belts, driving belts, etc. Therefore, it should be understood that the invention is not limited to the particular forms shown and described but is actually defined in the appended claims.

What I claim is:

1. A belt structure including a rubber body, reinforcing cord members embedded in the body in substantially a middle plane thereof and a cover for the belt of rubberized fabric integrally vulcanized to the belt body, said cover fabric being formed of spaced, sustantially non-undulating weft cords which extend laterally of the belt, and with warp cords having more twist than is necessary to give maximum tensile strength, whereby to definitely increase their resiliency and resistance to fatigue, said warp cords being substantially in contact with each other and extending longitudinally in undulating, over-and-under relation with the weft cords of the belt.

2. A belt structure including a body, reinforcing members embedded in the body, and a cover for the belt of fabric, said cover fabric being formed of spaced, substantially non-undulating weft cords which extend laterally of the belt, and with warp cords of a twist approximately 14% to 24% greater than that necessary to obtain maximum tensile strength, whereby to definitely increase their resiliency and resistance to fatigue, said warp cords being substantially in contact with each other and extending longitudinally in undulating, over-and-under relation with the weft cords of the belt.

3. A belt structure including a body, reinforcing members in the body, and a cover for the belt of fabric integral with the belt body, said cover fabric being formed of weft cords which extend laterally of the belt and with warp cords having more twist than is necessary to give maximum tensile strength, whereby to definitely increase their resiliency and resistance to fatigue, said warp cords extending longitudinally in undulating, over-and-under relation with the weft cords of the belt.

4. A belt structure including a rubber body, reinforcing cord members embedded in the body in substantially a middle plane thereof and a cover for the belt of rubberized fabric integrally vulcanized to the belt body, said cover fabric being formed of weft cords which extend laterally of the belt and with warp cords of a twist, approximately 14% to 24% greater than that necessary to obtain maximum tensile strength, whereby to definitely increase their resiliency and resistance to fatigue, said warp cords extending longitudinally in undulating, over-and-under relation with the weft cords of the belt.

5. A belt structure including a rubber body, and a cover for the belt of rubberized fabric integrally vulcanized to the belt body, said cover fabric being formed of spaced, substantially non-undulating weft cords which extend laterally of the belt and with warp cords having more twist than is necessary to give maximum tensile strength, whereby to definitely increase their resiliency and resistance to fatigue, said warp cords being substantially in contact with each other and extending in undulating, over-and-under relation with the weft cords longitudinally of the belt.

6. A belt structure including a rubber body, reinforcing cord members embedded in the body and a cover for the belt of rubberized fabric secured to the belt body, said cover fabric being formed of weft cords which extend laterally of the belt and with warp cords of a twist approximately 14% to 24% greater than that necessary to obtain maximum tensile strength, whereby to definitely increase their resiliency and resistance to fatigure, said warp cords extending longitudinally of the belt.

7. A belt structure including a rubber body and a cover for the belt of rubberized fabric secured to the belt body, said cover fabric being formed of spaced, substantially non-undulating weft cords which extend laterally of the belt, and with warp cords substantially in contact with each other and extending longitudinally of the belt in undulating, over-and-under relation with the weft cords.

8. A belt structure including a rubber body, reinforcing cord members embedded in the body in substantially a middle plane thereof and a cover for the belt of rubberized fabric integrally vulcanized to the belt body, said cover fabric being formed of spaced, substantially non-undulating weft cords which extend laterally of the belt, and with warp cords substantially in contact with each other and extending longitudinally of the belt in undulating, over-and-under relation with the weft cords.

9. In a belt, the combination of a body and a body cover, said body cover including rubberized longitudinal cords in close side-by-side relation, said cords being twisted approximately 14% to 20% in excess of the twist necessary to achieve maximum tensile strength whereby the ability of the cover to resist high and periodic tension and compression forces without failure is greatly increased.

HAROLD E. COLLINS.